United States Patent [19]

Spargo

[11] Patent Number: 4,494,760
[45] Date of Patent: Jan. 22, 1985

[54] PRESSURE BALANCED FLOATING SEAL

[75] Inventor: John D. Spargo, Annapolis, Md.

[73] Assignee: The United States of America as represented by the Secretary of the Navy, Washington, D.C.

[21] Appl. No.: 518,710

[22] Filed: Jul. 29, 1983

[51] Int. Cl.³ .......................... F16J 15/28; F16J 15/40
[52] U.S. Cl. .......................................... 277/30; 277/75
[58] Field of Search ...................... 277/30.3, 27, 72–75

[56] References Cited

U.S. PATENT DOCUMENTS

| | | | |
|---|---|---|---|
| 3,047,299 | 7/1962 | Karsten | 277/75 |
| 3,179,423 | 4/1965 | McCloud | 277/30 |
| 3,620,243 | 11/1971 | Zatopek | 277/75 |
| 3,756,673 | 9/1973 | Strub | 277/75 |
| 3,785,659 | 1/1974 | Maurer | 277/75 |
| 3,953,037 | 4/1976 | Winfield | 277/30 |
| 4,229,011 | 10/1980 | Wikelski | 277/75 |
| 4,253,558 | 10/1982 | Firth | 277/30 |
| 4,413,830 | 11/1983 | Pietsch | 277/30 |

Primary Examiner—Robert I. Smith
Attorney, Agent, or Firm—R. F. Beers; L. A. Marsh

[57] ABSTRACT

A shaft seal that is slidably mounted in a housing with essentially equal or balanced forces acting on each radial side. Fluid from the high pressure side of the shaft is communicated to equal areas on the two sides by ducts and constrained to the design areas by "O" rings. The seal moves radially in response to shaft displacements while maintaining a sealing relationship between packing material and the shaft.

9 Claims, 2 Drawing Figures

PRESSURE BALANCED FLOATING SEAL

BACKGROUND OF THE INVENTION

1. Field of the Invention

This invention relates generally to shaft seals and more specifically to a shaft sealing device having a pressure balanced floating housing.

2. Description of Prior Art

Shaft packing has been used on submarines since World War II. The nuclear powered submarines have larger shafts and operate at greater depths and development efforts have concentrated exclusively on mechanical face seals. The recent nuclear submarines have had still larger shafts. Unfortunately, the mechanical face seals are expensive and have to be replaced often due to wear and corrosion problems. They are becoming very heavy and costly in the larger sizes and have some problems with distortion under pressure, manufacturing tolerances and secondary "O" ring seal support for the seal ring. Some of the problems can be overcome by new configurations and more costly materials. The seals require very careful experienced mechanics to assemble the split configuration over the shaft and there is no assurance that the surface dimensions are acceptable after assembly.

The concept of using packings for shaft sealing has been in use for a long time. Their usefulness has been greatly limited by their inability to perform at elevated pressures and at high shaft surface velocities (without burning up), and an inability to be adaptable to radial shaft motions. Recently, packing materials have become available that offer higher temperature capabilities, lower coefficients of friction, greater strand tensile yields (better protection against packing degradation), and lower wear.

The successful operation of packings requires that the gap between the shaft and housing be small. This prevents excessive extrusion of the packing or even blow-out of the seal. The small gap however prohibits any appreciable shaft radial motion; excessive motion would result in eventual shaft damage. This requirement prevented the use of packings for large shaft operation, where radial shaft motion is unavoidable, or where shock loadings would be encountered.

SUMMARY OF THE INVENTION

These problems have been overcome in the present invention by mounting the packing material in a non-rotating housing that is free to move radially in response to shaft translation and by balancing the pressure acting on the two faces of the housing to minimize radial friction which opposes free movement of housing.

Accordingly, one object of the invention is to provide a new and improved shaft seal.

Another object of the invention is to provide a shaft seal that will be adaptive to radial shaft motions.

A further object is to provide a shaft seal that can withstand high differential pressures and radial shaft motions without incurring excessive extrusion of the packing material or damage to the shaft.

A still further obJject is to provide a relatively inexpensive and easily fabricated high pressure seal that can withstand radial shaft motions and high differential pressures with reduced required maintenance.

Other objects, advantages, and novel features of the invention will become apparent from the following detailed description of the invention when considered in conjunction with the accompanying drawings wherein.

DETAILED DESCRIPTION OF THE DRAWINGS

Figure 1:
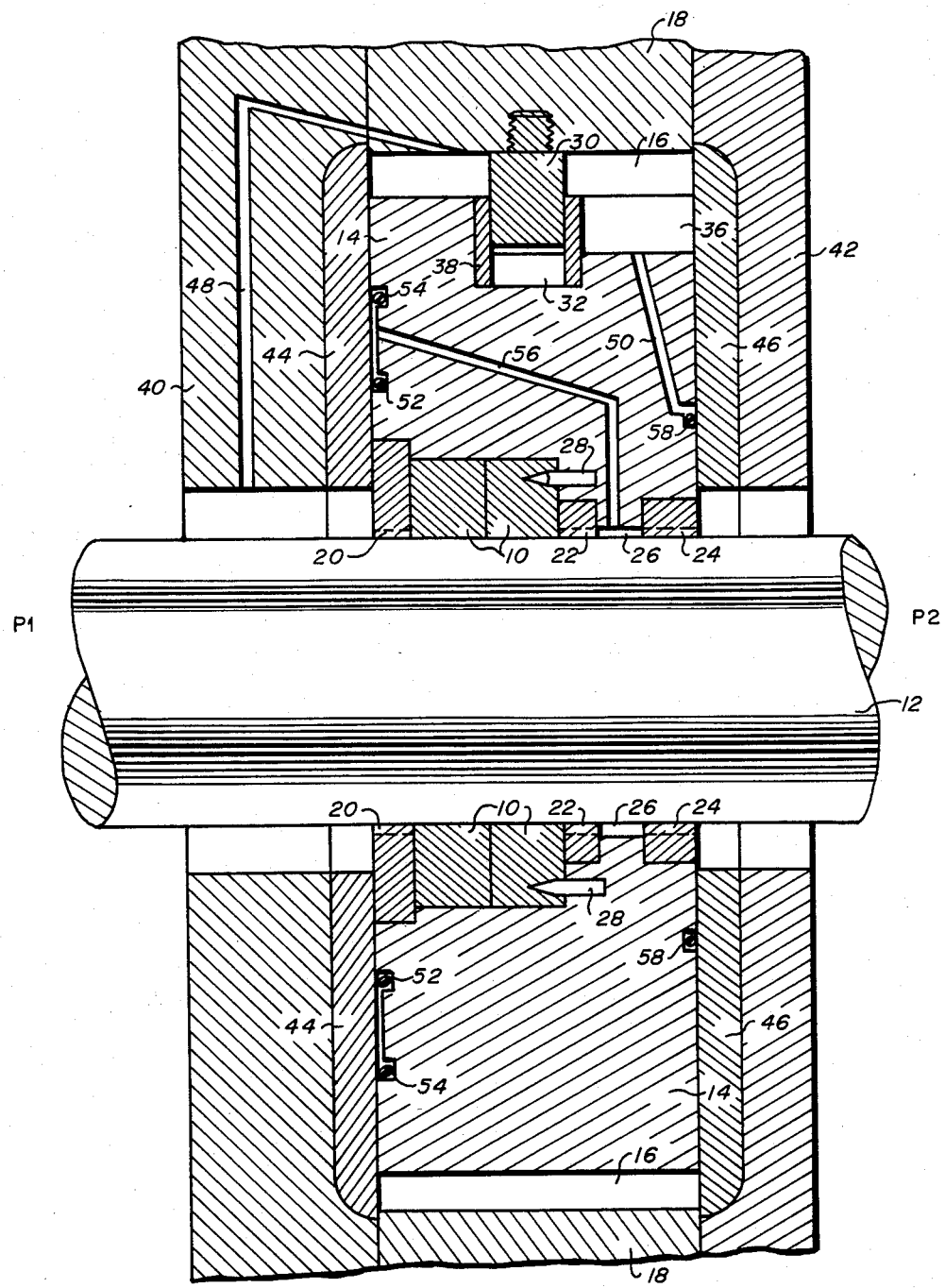
FIG. 1 shows a section view of the pressure balanced floating seal taken along the axis of the shaft.

FIG. 1 shows 2 annular packing rings, 10, mounted around a shaft, 12, that extends from a high pressure environment, P1, to an area of reduced pressure P2, as, for instance, from the propeller side of a submarine shaft into the submarine itself. The seams of the 2 packing rings are offset 180° from each other to minimize leakage. The packing rings are carried in an annular floating housing, 14, which fits within an oversized annular cavity, 16, in an outer ring, 18. The floating housing is supported on the shaft by three annular bearings, 20 on the high pressure side of the housing, 22 on the low pressure side, and 24 located just behind, or on the low pressure side of the packing rings, which also serves to limit extrusion of the packing material. These bearings prevent wearing contact between the floating housing, 14, and the shaft, 12, by setting a gap, 26, between these elements. The surfaces of the bearings facing the shaft are axially grooved to prevent the occurrence of pressure differentials across the bearings and to permit the flow of water to provide cooling for the bearings.

The packing rings are prevented from rotating within the housing, 14, by axial metal pins, 28, which extend from the housing into the packing material. The housing itself is prevented from rotating within the outer ring by one or more radial pins, 30, which are threaded into the outer ring, 18, and extend through the annular cavity, 16, between the housing and the outer ring, and into the floating housing 14. The receiving holes, 32 for these radial pins, 30, in the floating housing, are oversized to permit free radial movement of the housing within the ring in response to radial shaft motion while preventing rotational movement. A keyway, 36, is provided in the floating housing for each radial pin to permit assembly, and the receiving hole, 32, in the housing, 14, is also lined with a bearing material, 38, to reduce wear and friction between the pin and the housing.

The floating housing is held in place axially by housing rings, 40, and 42, located on the high and low pressure side of the shaft respectively. Annular wear plates, 44 and 46, on the high and low pressure sides of the housing respectively, are made of material that will resist water swell such as Ultra High Molecular Weight Polyethelene (UHMWPE), and are provided between the housing rings and the floating housing to reduce wear and friction as the floating housing moves radially relative to the housing rings.

In order to allow free radial movement of the floating housing, the loading forces acting on its two radial faces must be axially balanced. This is accomplished by allowing fluid from the high pressure side of the shaft to act on equal areas on the two sides of the floating housing. High pressure fluid is communicated to the inner portion of the high pressure side of the housing directly through the tolerance gaps between the shaft, 12, wearplate 44, on the high pressure side, and the floating housing, 14. High pressure fluid is communicated to the outer portion of the high pressure side of the housing through one or more ducts, 48, in the high pressure housing ring 40, which opens into the annular cavity, 16. One or more additional ducts, 50, communicate high pressure from the cavity to the outer portion of the low pressure side of the housing Two "O" rings, 52 and 54, are located on the high pressure side between the wearplate 44, and the floating housing, 14. The area between the "O" rings is maintained at low pressure by one or more venting ducts, 56, which open to the low pressure gap, 26, between bearings, 22 and 24. A third "O" ring, 58, located on the low pressure side between wearplate, 46, and the floating housing, 14, limits the extent of high pressure transmitted either via ducts, 50, or between the housing, 14 and wearplate, 46, to the outer portion of the floating housing surface. The radii for "O" rings, 52, 54 and 58, are selected to provide essentially equal annular areas over which high pressure acts on each of the faces of the floating housing in order to maintain freely slidable force balancing for the floating housing, 14.

Duct, or ducts, 50, are provided to communicate high pressure to the low pressure side of the housing in order to assure force balancing even in the event that a pressure seal develops along that face as a result of heavy loading. Similarly, the inclusion of redundancy for each of the ducts, 48, 50 and 56, provides insurance that force balancing can be maintained despite minor clogging from particles carried by the fluid.

Figure 2:
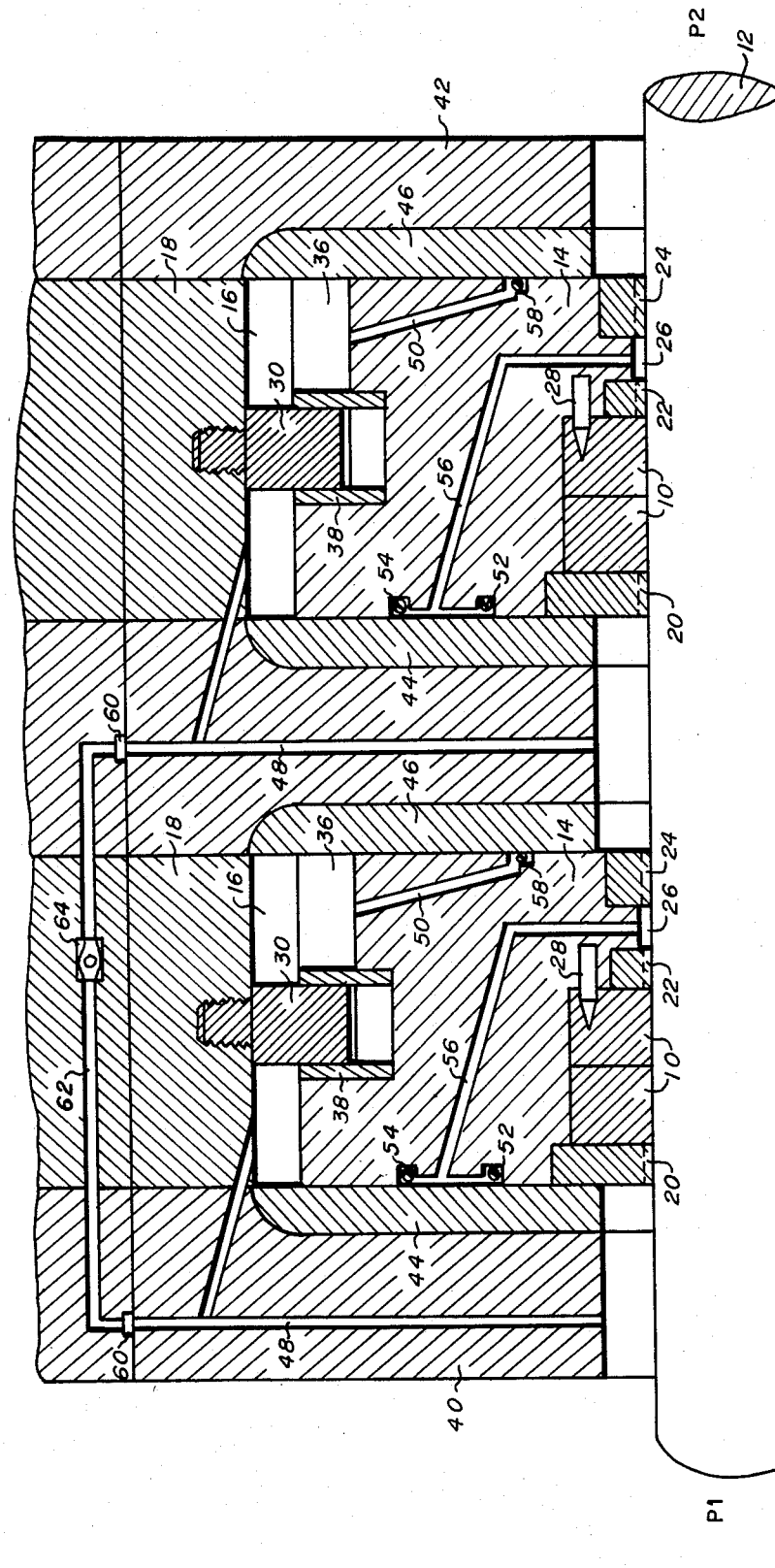
FIG. 2 is a half section view of a two-stage embodiment of the balanced seal according to this invention.

FIG. 2 shows a half section view of an embodiment of the present invention in which two pressure balanced floating seals are arranged in a series, or cascade relationship, along a shaft in order to provide more distributed loading and to reduce the pressure differential across each seal. The individual elements, or components, of each of the two floating seals are similar to those described in FIG. 1 and are so identified by the same numerals. In this staged configuration, the high pressure inlet ducts, 48, in the high pressure housing rings, 40, extend radially to the outer edge of the ring and terminate in fittings, 60. These fittings, 60, are connected by a duct, 62, which passes through a valve, 64, which produces a 50% pressure drop. Thus, the pressure on the low pressure side of the first seal and on the high pressure side of the second seal is one half that on the high pressure side of the first seal. Pressure balancing is maintained across each floating seal and the pressure drop across the two seals is distributed equally.

A capillary system or other suitable means can be used rather than the valve, 64, to produce the desired pressure drop, and any number of floating pressure balanced seals can be employed in this staged configuration.

Obviously, many modifications and variations of this invention are possible in light of the above teachings. It is therefore to be understood that within the scope of the appended claims the invention may be practiced otherwise than as specifically described.

What is claimed is:

1. A sealing device for shafts which pass through a wall, said sealing device including at least one annular housing adapted to be mounted around a shaft, said at least one annular housing including a ring-shaped chamber having disposed therein at least one layer of a sealing material adjacent said shaft, wherein the improvement comprises:

an oversized outer ring disposed radially adjacent said at least one annular housing and adapted to permit sliding of said at least one annular housing radially outwardly from said shaft;

at least one antirotation pin extending from the outer ring into said at least one annular housing and adapted to permit radial sliding of said at least one annular housing with respect to said oversized outer ring; and means for balancing frictional forces acting on radial surfaces of said at least one annular housing.

2. The sealing device according to claim 1 further comprising a plurality of pins extending axially from said at least one annular housing into the sealing material to prevent rotation of the sealing material relative to said at least one annular housing.

3. The sealing device according to claim 1 further comprising at least one axially grooved annular bearing adapted to support said at least one annular housing on the shaft.

4. The sealing device according to claim 1 wherein said means for balancing said frictional forces acting on said radial surfaces of said at least one annular housing further comprises:

first and second annular bearing plates adapted to enclose said at least one annular housing therebetween such that a volume is defined by said first and second annular bearing plates, said oversized outer ring and said at least one annular housing;

a first O-ring disposed in a sealing relationship between the first bearing plate on a high pressure side of said at least one annular housing and said at least one annular housing;

a second O-ring having a greater diameter than the first O-ring disposed in a sealing relationship between the first bearing plate on the high pressure side of said at least one annular housing and said at least one annular housing such that an annular sealed area is defined between said second O-ring and said first O-ring;

a first ductway communicating the annular sealed area between said first O-ring and said second O-ring to a low pressure side of said at least one annular housing;

a third O-ring disposed in a sealing relationship between the second bearing plate on the low pressure side of said at least one annular housing and said at least one annular housing such that an annular area is defined between said third O-ring and an outer diameter of said at least one annular housing;

a second ductway communicating a high pressure fluid to the volume between said at least one annular housing and the oversized outer ring; and a third ductway communicating the annular area between said third O-ring and the outer diameter of said at least one annular housing to said high pressure fluid in said volume;

wherein radii of said first, second and third O-rings are selected such that forces acting on a high pressure radial surface of said at least one annular housing are essentially equal to forces acting on a low pressure radial surface of said at least one annular housing.

5. A sealing device according to claim 4 wherein a lubricating fluid is used within the sealing device, said lubricating fluid being pressurized by but separated from the high pressure zone fluid.

6. A sealing device for shafts which pass from a high pressure zone through a wall into a lower pressure zone, said sealing device including an annular housing adapted to be mounted around a shaft on annular bearings, said housing including a ring-shaped chamber in which is disposed at least one layer of sealing material, the inner surface of said layer of sealing material being adjacent to the outer surface of the shaft, the improvement comprising slidably mounting said housing between annular wear plates;
enclosing said housing in an oversized outer ring;
slidably connecting said housing to the outer ring by at least one pin extending from the outer housing into a receiving orifice in the housing to prevent rotation of the housing relative to the outer ring;
providing axial grooves in the inner surface of the annular bearings;
affixing two "O" rings in sealing arrangement between the housing and the radial surface of the annular wear plate on the high pressure side;
venting the area between the two "O" rings on the high pressure side of the housing in the low pressure zone;
affixing a third "O" ring in a sealing arrangement between the housing and the radial surface of the annular wear plate on the low pressure side;
communicating high pressure fluid to the volume between the annular housing and the oversized outer ring;
communicating high pressure to the area defined between the third "O" ring and the outer diameter of the housing on the low pressure side;
selecting the radii of the three "O" rings such that the sum of forces acting on the high pressure radial surface of the housing is essentially equal to the sum of forces acting on the low pressure radial surface of the housing.

7. A sealing device for shafts which pass from a high pressure zone through a wall into a lower pressure zone comprising;
an annular housing which surrounds the shaft and contains at least one receiving hole;
a first axially grooved annular bearing with its radial surface on the high pressure side coplanar with the radial surface on the high pressure of the housing which supports and separates the annular housing from the shaft;
at least one layer of sealing material the inner surface of which is pressed against the outer surface of the shaft by the housing and with its radial surface on the high pressure side coplanar with the radial surface on the low pressure side of the said first bearing;
a second axially grooved annular bearing with its radial surface on the high pressure side coplanar with the radial surface on the low pressure side of the said sealing material which supports and separates the annular housing from the shaft;
a third axially grooved annular bearing with its radial surface on the high pressure side separated from the radial surface on the low pressure side of the said second bearing and with its radial surface on the low pressure side coplanar with the radial surface on the low pressure side of the housing which supports and separates the annular housing from the shaft;
a plurality of pins extending axially from the housing into the sealing material to prevent rotation of the sealing material relative to the housing;
a fixed outer annular ring with its radial surfaces coplanar with the radial surfaces of the housing and with its inner diameter larger than the outer diameter of the housing;
at least one pin extending slidably from the said outer ring into an oversized receiving orifice in the outer surface of the housing to limit rotation of the housing relative to the outer ring;
a first annular ar wear plate with its low pressure radial surface coplanar with the high pressure radial surface of the housing which slidably supports the housing in the axial direction;
a second annular wear plate with its high pressure radial surface coplanar with the low pressure radial surface of the housing which slidably supports the housing in the axial direction;
ducting which communicates fluid from the high pressure side to the volume between the housing and the outer ring;
a first "O" ring in a sealing arrangement between the first annular wear plate and the housing;
a second "O" ring of larger diameter than the first "O" ring in sealing arrangement between the first annular wear plate and the housing;
a third "O" ring sealably arranged between the second annular wear plate and the housing;
ducting communicating high pressure fluid from the volume between the housing and the outer ring to the surface between the third "O" ring and the housing outer diameter on the low pressure radial surface of the housing;
ducting venting from the area between the first and second "O" rings on the high pressure side of the housing to the low pressure volume between the second and third annular bearings on the inner axial surface of the housing.

8. A sealing device for shafts which pass from a high pressure zone through a wall into a lower pressure zone comprising;
a first annular housing which surrounds the shaft and contains at least one receiving hole;
a first axially grooved annular bearing with its radial surface on the high pressure side of the first annular housing coplanar with the radial surface on the high pressure side of the housing which supports and separates the annular housing from the shaft;
at least one layer of sealing material the inner surface of which is pressed against the outer surface of the shaft by the first annular housing and with its radial surface on the high pressure side coplanar with the radial surface on the low pressure side of the said first bearing;
a second axially grooved annular bearing with its radial surface on the high pressure side coplanar with the radial surface on the low pressure side of the said sealing material which supports and separates the first annular housing from the shaft;
a third axially grooved annular bearing with its radial surface on the high pressure side separated from the radial surface on the low pressure side of the said second bearing and with its radial surface on the low pressure side coplanar with the radial surface on the low pressure side of the first annular housing which supports and separates the annular housing from the shaft;
a plurality of pins extending axially from the first housing into the sealing material to prevent rotation of the sealing material relative to the housing;
a first fixed outer annular ring with its radial surfaces coplanar with the radial surfaces of the first annular housing and with its inner diameter larger than the outer diameter of the housing;

at least one pin extending slidably from the said first outer ring into an oversized receiving orifice in the outer surface of the first annular housing to limit rotation of the housing relative to the outer ring;

a first annular wear plate with its low pressure radial surface coplanar with the high pressure radial surface of the first annular housing which slidably supports the housing in the axial direction;

a second annular wear plate with its high pressure radial surface coplanar with the low pressure radial surface of the first annular housing which slidably supports the housing in the axial direction;

ducting which communicates fluid from the high pressure side of the first annular housing to the volume between the first housing and the first outer ring;

a first "O" ring in a sealing arrangement between the first annular wear plate and the first annular housing;

a second "O" ring of larger diameter than the first "O" ring in sealing arrangement between the first annular wear plate and the first annular housing;

a third "O" ring sealably arranged between the second annular wear plate and the first annular housing;

ducting communicating high pressure fluid from the volume between the first annular housing and the first outer ring to the surface between the third "O" ring and the first housing outer diameter on the low pressure radial surface of the housing;

ducting venting from the area between the first and second "O" rings on the high pressure side of the housing to the low pressure volume between the second and third annular bearings on the inner axial surface of the first annular housing;

means for producing a 50% pressure drop;

ducting communicating high pressure fluid from the high pressure side of the first annular housing to the means for producing a 50% pressure drop;

ducting communicating the said reduced pressure fluid from the means for producing a 50% pressure drop to the low pressure side of the first annular housing;

a second annular housing located on the low pressure side of the first annular housing which surrounds the shaft and contains at least one receiving hole;

a fourth axially grooved annular bearing with its radial surface on the high pressure side of the second annular housing coplanar with the radial surface on the high pressure side of the second housing which supports and separates the annular housing from the shaft;

at least one layer of sealing material the inner surface of which is pressed against the outer surface of the shaft by the second housing and with its radial surface on the high pressure side coplanar with the radial surface on the low pressure side of the said fourth bearing;

a fifth axially grooved annular bearing with its radial surface on the high pressure side of the second annular housing coplanar with the radial surface on the low pressure side of the said sealing material which supports and separates the second annular housing from the shaft;

a sixth axially grooved annular bearing with its radial surface on the high pressure side separated from the radial surface on the low pressure side of the said fifth bearing and with its radial surface on the low pressure side coplanar with the radial surface on the low pressure side of the second housing which supports and separates the second annular housing from the shaft;

a plurality of pins extending axially from the second housing into the sealing material to prevent rotation of the sealing material relative to the housing;

a second fixed outer annular ring with its radial surfaces coplanar with the radial surfaces of the second annular housing and with its inner diameter larger than the outer diameter of the housing;

at least one pin extending slidably from the said second outer ring into an oversized receiving orifice in the outer surface of the second annular housing to limit rotation of the housing relative to the outer ring;

a third annular wear plate with its low pressure radial surface coplanar with the high pressure radial surface of the second annular housing which slidably supports the housing in the axial direction;

a fourth annular wear plate with its high pressure radial surface coplanar with the low pressure radial surface of the second annular housing which slidably supports the housing in the axial direction;

ducting which communicates fluid from the means for producing a 50% pressure drop to the volume between the second housing and the second outer ring;

a fourth "O" ring in a sealing arrangement between the third annular wear plate and the second housing;

a fifth "O" ring of larger diameter than the fourth "O" ring in sealing arrangement between the third annular wear plate and the second housing;

a sixth "O" ring sealably arranged between the fourth annular wear plate and the second housing;

ducting communicating fluid from the volume between the second housing and the second outer ring to the surface between the sixth "O" ring and the second housing outer diameter on the low pressure radial surface of the housing;

ducting venting from the area between the fourth and fifth "O" rings on the high presure side of the second housing to the low pressure volume between the fifth and sixth annular bearings on the inner axial surface of the second housing.

9. A sealing device according to claim 4 further comprising a second said sealing device located along the shaft on the low pressure side of the first said sealing device wherein the pressure drop between the high pressure zone and the low pressure zone is shared equally between the two said sealing devices by communicating high pressure fluid from the high pressure side of the first sealing device through a pressure metering means which reduces the transmitted pressure by 50% and further communicating this reduced pressure to the low pressure side of the first sealing device and to the high pressure side of the second device.

* * * * *